United States Patent Office 3,404,557
Patented Oct. 8, 1968

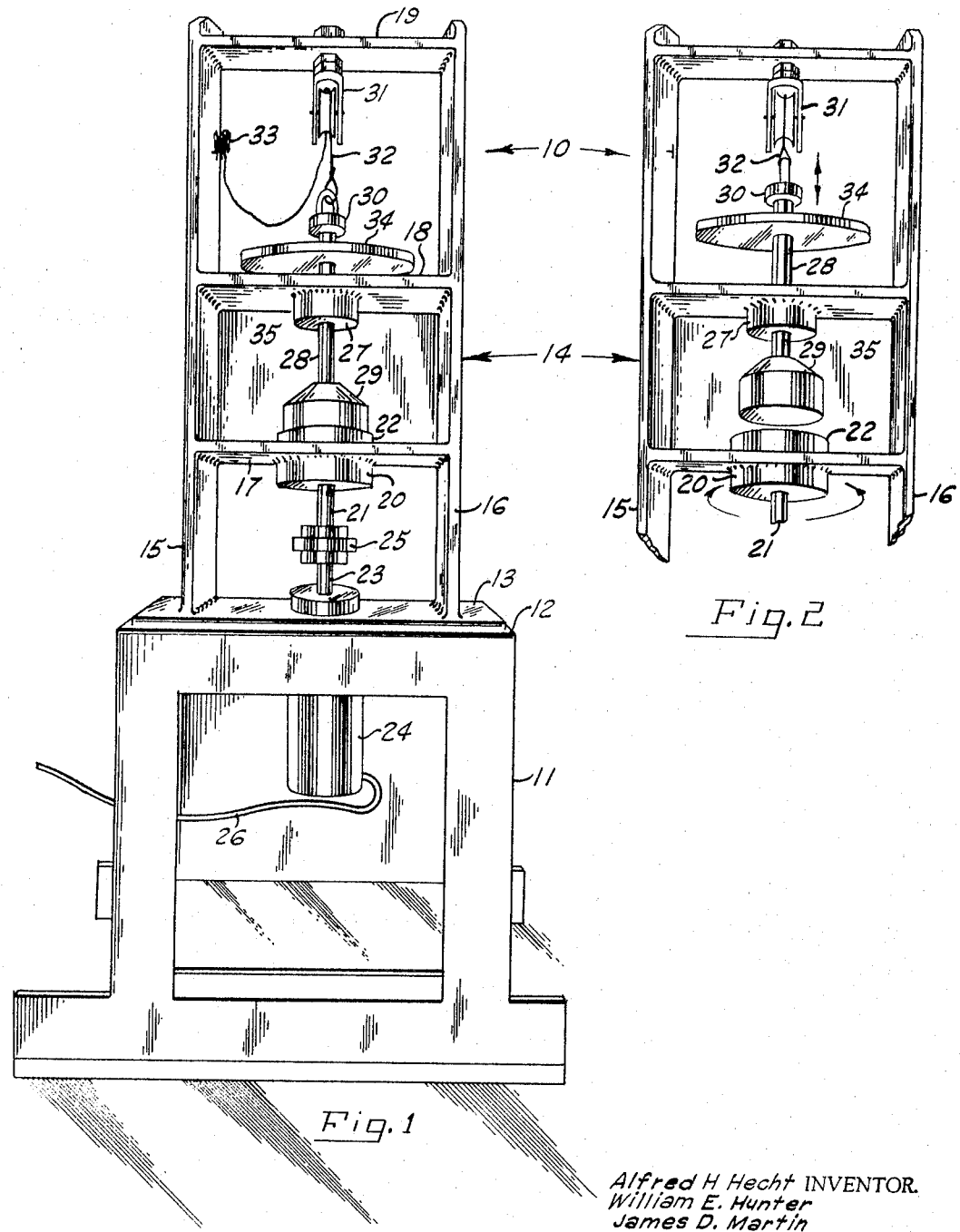

3,404,557
FRICTION TESTER FOR DETERMINING FRICTION SENSITIVITY OF SOLID PROPELLANTS
Alfred H. Hecht and William E. Hunter, Huntsville, Ala., and James D. Martin, Springfield, Va., assignors to Thiokol Chemical Corporation, Bristol, Pa., a corporation of Delaware
Filed Dec. 29, 1966, Ser. No. 605,651
1 Claim. (Cl. 73—7)

ABSTRACT OF THE DISCLOSURE

An apparatus for testing by friction the sensitivity of solid propellants which includes a stand, a frame having a plurality of shelves mounted on the stand, a pair of diametrically opposed vertical shafts mounted in the shelves, one having reciprocal movement and the other one having rotary movement, a tray mounted on one of the shafts whereby when weights are positioned on the tray the reciprocal disc will be forced against the rotary disc to frictionally test the sensitivity of a segment of solid propellant positioned between the discs.

---

This invention relates to improvements in friction testers and more particularly to a friction tester that is used to determine the friction sensitivity of solid propellants.

There are several factors that must be considered in determining the sensitivity of solid propellants to determine what hazards will be involved in the processing and handling of such propellants. One of the main causes of preignition of solid propellants is heat caused by frictional contact of some object with the solid propellant. In some instances the frictional contact will not reach the ignition point, in other instances the frictional contact may well exceed the ignition point of the propellant.

It is an object of this invention, therefore, to provide a friction tester that will determine the amount of frictional contact that can be made with solid propellants before preignition of the solid propellant occurs and creates safety hazards in the processing and handling of the solid propellant.

The friction tester is used with small samples of solid propellant so that the friction tester will not be damaged by the preignition of the solid propellant. The friction tester is also constructed so that there is no safety hazard that will cause injury to the operator of the friction tester.

With the above and other objects and advantages in view, the invention consists of the novel details of construction, arrangement and combination of parts more fully hereinafter described, claimed and illustrated in the accompanying drawing in which:

FIGURE 1 is an elevational view of a friction tester embodying the invention in operational position; and FIGURE 2 is a similar view with parts broken away, showing the friction tester in inoperative position.

Referring more in detail to the drawing, wherein like parts are designated by like reference numerals, the reference numeral 10 is used to generally designate a friction tester embodying the invention.

The friction tester 10 comprises a stand 11 which is adapted to rest on any suitable level surface. The stand 11 has a level top 12 on which is positioned a rectangular-shaped base 13 of a substantially U-shaped frame 14. The base 13 of the frame 14 may be rigidly secured to the top 12 of the stand 11 by any well-known means, or it may be removably secured to the top 12 by any well-known fastening means.

Extending upwardly from the base 13 in vertical relation thereto are a pair of parallel spaced rectangular-shaped uprights 15 and 16 which complete the frame 14. The width of the uprights 15 and 16 are equal to the width of the base 13 and three horizontal rectangular-shaped shelves or partitions 17, 18 and 19 extend between the uprights 15 and 16 transversely thereof and in spaced parallel relation to each other and to the base 13. The outer edges of the ends of the shelves 17, 18 and 19 are rigidly secured to the inner surfaces of the uprights 15 and 16 and the width of the shelves 17, 18 and 19 are equal to the width of the uprights 15 and 16.

A bearing boss 20 is rigidly secured to the undersurface of the lower shelf 17 centrally thereof and a short driven shaft 21 is journalled for rotation therein. Secured to the upper end of the shaft 21 above the shelf 17 and slightly spaced therefrom is a disc or plate 22 and the lower end of the shaft 21 is coupled to a drive shaft 23 of an electric motor 24 by a conventional dynamically balanced clutch assembly 25. An electric cable 26 extends from the electric motor 24 to a conventionally controlled electrical power source whereby the speed of rotation, both forward and reverse, of the electric motor 24 may be controlled.

A second bearing boss 27 is rigidly secured to the undersurface of the intermediate shelf 18 centrally thereof and a shaft 28, somewhat longer than the shaft 21 and in vertical alignment therewith, is journalled for reciprocal movement in the bearing boss 27. Secured to the lower end of the shaft 28, so that it may come into contact with the disc 22, is a second disc or plate 29 and a coupling 30 is secured to the upper end of the shaft 28 above and in spaced relation to the shelf 18.

A pulley 31 is secured to the center of the upper shelf 19 and depends below the shelf 19 in vertical alignment with the coupling 30 and shaft 28. A rope 32 is connected at one end to the coupling 30 and is trained through the pulley 31 so that by manipulation of the rope 32 the shaft 28 and the disc 29, secured to the lower end thereof, can be reciprocated in relation to the disc 22. Some conventional means for retaining the loose end of the rope 32 in place may be secured to the upright 15 between the shelves 18 and 19 as at 33.

Rigidly secured to the shaft 28 between the coupling 30 and the shelf 18 is a circular tray member 34, the use of which will be later described.

A shield 35 is secured to the edges of the shelves 17 and 18 and uprights 15 and 16 to close in that area immediately to the rear of the discs 22 and 29 and a suitable transparent shield, not shown, may be secured in place in like manner to close that area immediately to the front of the discs 22 and 29.

They key elements of the friction tester 10 whereby its mode of operation is achieved, are the discs 22 and 29. The disc 22 is rotated by the electric motor 24, but the disc 29 does not rotate but is capable of being reciprocated in relation to the disc 22. The electric motor has an obtainable speed variation of from 2,000 to 10,000 r.p.m. and is energized by a 110 volt line current and the speed of rotation of the disc 22 may be monitored by an "Electric Eye" type tachometer.

While the plate 29 does not rotate, the bearing boss 27 permits reciprocation thereof with the least friction involved to eliminate any frictional errors that could occur during the reciprocation thereof. As previously stated, the disc 29 is reciprocated by means of the rope 32 that is trained through the pulley 31 and when the rope 32 has performed its function prior to the operation of the friction tester 10, it is uncoupled from the coupling 30 so that its weight will not be involved during the operation of the friction tester 10.

The method of operation of the friction tester is as follows: With the weight of the disc 29, shaft 28, tray 34 and coupling 30 known, the amount of force that is to be applied by the disc 29 is determined. If additional weight is required to give the desired amount of force, weights are placed on the tray 34 until the desired force is achieved.

With the disc 29 in retracted position, a sample of propellant, if it is tacky enough, may be adhered to the undersurface of the disc 29 or adhered to the upper surface of the disc 22. If the sample is not tacky, it is placed and adhered directly onto the upper surface of the disc 22 by a suitable adhesive.

The disc 22 is then rotated by the electric motor 24 until the desired speed has been achieved at which time the disc 29 is lowered until contact is made with the sample on the disc 22 or contact is made by the disc 22 with the sample that is adhered to the disc 29. As friction is created on the sample, a stop watch is started and the time required to ignite the sample by friction is recorded by the stop watch.

The operator of the friction tester may stand outwardly of the shield 35 to perform the necessary operations of the friction tester 10 in safety, or if a transparent shield is used, he may stand outwardly of such a shield and thus also operate the friction tester in safety, from this position.

The mode of operation and construction of the invention has been thoroughly described and it is believed that the same will be obvious to one skilled in the art, it also being understood that variations in the mode of operation and construction thereof may be adhered to provided such variations fall within the spirit of the invention and the scope of the appended claim.

Having thus described the invention what is claimed as new and desired to be secured by Letters Patent is:

1. A friction tester for determining the friction sensitivity of solid propellant comprising a stand, a U-shaped frame mounted on said stand, first, second and third shelves supported by said frame, a first bearing boss rigidly secured to the undersurface of said first shelf, a first vertical shaft extending through and journalled for rotation in the bearing boss on said first shelf, a first disc secured to the upper end of said first shaft, an electric motor secured to said stand and having the drive shaft thereof in vertical alinement with said first shaft, a dynamically balanced clutch connecting the end of the drive shaft of said motor to the lower end of said first shaft for the rotation of said first disc, a second bearing boss rigidly secured to the undersurface of said second shelf, a second vertical shaft extending through and journalled for reciprocal movement in the bearing boss on said second shelf in vertical alinement with said first shaft, a second disc secured to the lower end of said second shaft in vertical alinement with said first disc, a coupling secured to the upper end of said second shaft, a pulley secured to said third shelf and depending therefrom in vertical alinement with said first and second shafts and said first and second discs, a rope extended through said pulley and connected to the coupling secured to the upper end of said second shaft for reciprocating said second shaft and said second disc in relation to said first disc, and a circular tray secured to said second shaft intermediate of said second shelf and said coupling in vertical alinement with said first and second discs whereby weights may be positioned on said tray to increase the downward force of said second disc during the operation of said friction tester so that when a sample of solid propellant is positioned between said first and second discs the friction sensitivity of said sample may be determined.

References Cited

UNITED STATES PATENTS

| | | | |
|---|---|---|---|
| 1,490,603 | 4/1924 | Elverson | 73—9 |
| 2,412,221 | 12/1946 | Kallas et al. | 73—7 |
| 2,815,658 | 12/1957 | Press | 73—7 |
| 2,895,326 | 7/1959 | Fesperman et al. | 73—7 |
| 3,060,719 | 10/1962 | Pearlman | 73—7 |
| 3,358,495 | 12/1967 | Baist | 73—7 |

S. CLEMENT SWISHER, *Acting Primary Examiner.*

JEFFERY NOLTON, *Assistant Examiner.*